United States Patent
Porwal

(10) Patent No.: US 8,400,493 B2
(45) Date of Patent: Mar. 19, 2013

(54) VIRTUAL STEREOSCOPIC CAMERA

(75) Inventor: Gunjan Porwal, Banjara Hills (IN)

(73) Assignee: QUALCOMM Incorporated, San Diego, CA (US)

(*) Notice: Subject to any disclaimer, the term of this patent is extended or adjusted under 35 U.S.C. 154(b) by 1318 days.

(21) Appl. No.: 11/767,561

(22) Filed: Jun. 25, 2007

(65) Prior Publication Data

US 2008/0316299 A1 Dec. 25, 2008

(51) Int. Cl.
*H04N 15/00* (2006.01)
(52) U.S. Cl. ........... 348/46; 345/207; 600/411; 359/462
(58) Field of Classification Search .................. 348/46
See application file for complete search history.

(56) References Cited

U.S. PATENT DOCUMENTS

| | | | |
|---|---|---|---|
| 5,880,883 A * | 3/1999 | Sudo | 359/462 |
| 6,016,439 A * | 1/2000 | Acker | 600/411 |
| 7,710,647 B2 * | 5/2010 | Takahashi | 359/464 |
| 2005/0281411 A1 * | 12/2005 | Vesely et al. | 381/61 |
| 2006/0007222 A1 * | 1/2006 | Uy | 345/207 |

* cited by examiner

*Primary Examiner* — Yves Dalencourt
(74) *Attorney, Agent, or Firm* — James R. Gambale, Jr.

(57) ABSTRACT

The subject matter relates to a virtual stereoscopic camera for displaying 3D images. In one implementation, left and right perspectives of a source are captured by image capturing portions. The image capturing portions include an array of image capturing elements that are interspersed with an array of display elements in a display area. The image capturing elements are confined within limited portions of the display area and are separated by an offset distance. The captured left and right perspectives are synthesized so as to generate an image that is capable of being viewed in 3D.

26 Claims, 3 Drawing Sheets

VIRTUAL STEREOSCOPIC CAMERA

BACKGROUND

Many devices are currently available that synthesize images in a variety of formats, such as in color, grayscale, and the like. The images displayed by such devices are, however, displayed as two dimensional images. Mechanisms currently exist that allow displaying of images on a two-dimensional display screen in 3D formats. The image is not itself in a 3D format but is projected in such a way that allows it to be perceived as a 3D image. These techniques involve the creation of perception of depth, allowing images to be perceived as 3D images. Similar mechanisms can also be implemented for motion pictures. These techniques have been popularized in the past by studios in the business of producing 3D motion picture.

Typically a 3D effect in images or motion pictures is created by introducing a perception of depth in an image or scenes of a motion picture. It is accomplished by capturing two different images of a source from two different lenses. The lenses are separated from each other by an offset distance. Generally, the offset distance is equivalent to the average intraocular distance, which is the average distance between the eyes of a human being. The images captured from the two different lenses are then eventually displayed. A newly displayed image is formed by superimposing the captured images that are offset by a distance, the offset distance being proportional to the inter-ocular distance. The new image can be viewed with the help of 3D glasses that create the intended depth perception and provide the new image with the 3D effect.

SUMMARY

This summary is provided to introduce concepts relating to displaying 3D images using a virtual stereoscopic camera. These concepts are further described below in the detailed description. The presented summary is not intended to identify essential features of the claimed subject matter, nor is it intended for use in determining the scope of the claimed subject matter.

In one implementation, left and right perspectives of a source are captured by image capturing portions. The image capturing portions include an array of image capturing elements that are interspersed with an array of display elements in a display area. The image capturing elements are confined within limited portions of the display area and are separated by an offset distance. The captured left and right perspectives are synthesized so as to generate an image that is capable of being viewed in 3D.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Systems and methods for capturing and displaying images in 3D format are described. A typical 3D image, also referred to as a stereoscopic image, is created by capturing two different perspective of a source. The capturing of the perspectives can be accomplished by using two lenses that are horizontally displaced by an offset distance or by taking two images corresponding to different perspective from a single lens from two different positions. The positions would be separated by a similar offset distance.

The offset distance is generally equivalent to the intraocular distance of human eyes. The captured perspectives of the image in principle correspond to images that are perceived independently, i.e., perceived by the left and right eye of an individual. These perspectives, when viewed individually by the human eyes, create the perception of depth. This allows the image to be perceived as a 3D image when displayed.

To this end, the system described includes agents or program modules that are responsible for capturing the left and the right perspectives a source. The various perspectives are captured by two portions of a display screen of the system. The image capturing portions include an array of display elements interspersed with image capturing elements. The display elements include elements that can display data corresponding to a picture element, i.e., a pixel. The image capturing elements can capture images corresponding to a source. In this manner, the capturing portions can be additionally utilized as display portions in conjunction with the remaining display screen.

The capturing portions can be separated by an offset distance, for example, the average intraocular distance between the human eyes. This is implemented in this manner so as to replicate the natural disposition of the human eyes.

The captured perspectives can be processed or synthesized by one or more modules. These modules are instrumented to synthesize the captured images into an image that can be viewed in 3D. As an implementation the captured perspective can be associated with different attributes that enable synthesizing of the captured images as a 3D image. For example, the captured images may be associated with two different complimentary colors allowing the final image to be viewed as a 3D image through anaglyph glasses.

It would be appreciated that various other aspects of described systems and methods can be implemented in any number of different computing systems, environments, and/or configurations. The various exemplary implementations of a system for capturing and displaying images in a 3D format are described in the context of the following exemplary system.

An Exemplary System

Figure 1:
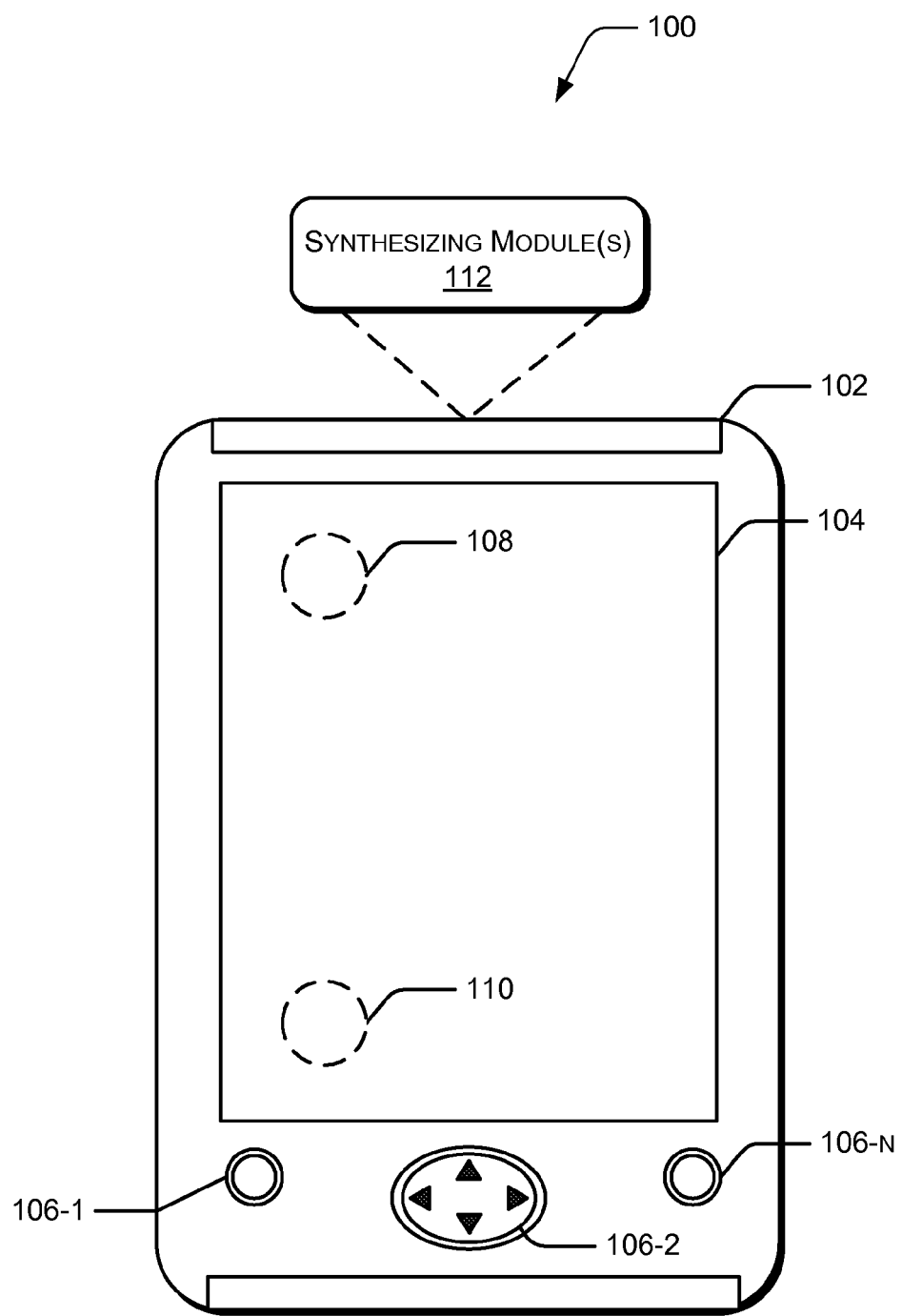
FIG. 1 illustrates an exemplary system for capturing and displaying images in a 3D format.

FIG. 1 illustrates an exemplary system 100 for capturing and displaying images in a 3D format. System 100 can include an image processing device 102. In one implementation, image processing device 102 can be a computing based device that is instrumented to perform one or more functions in response to the execution of one or more computer instructions. Image processing device 102 includes display area 104 and one or more control buttons 106(1)-(n). Display area 104 can be utilized for the display of output data, which may be generated as a result of the processing performed by one or more processing modules in image processing device 102.

Control buttons 106(1)-(n) are used for navigating through one or more features or functionalities that are associated with image processing device 102. For example, control button 106(1), as illustrated, may allow a user to switch-off image processing device 102 when not in use. It would be appreciated by a skilled person that other functionalities can be associated with control buttons 106(1)-(n).

Display area 104 includes portions 108 and 110. Portions 108 and 110 allow capturing of one or more images of a source, for example, images that correspond to left and right perspective of source. In addition, portions 108 and 110 can also be utilized for displaying visual information in conjunction with the remaining portion of display area 104. Display area 104 can, for example, be a liquid crystal display (LCD) panel.

As indicated previously, portions 108 and 110 include an array of display elements and image capturing elements, forming an integrated display sensing array. The display elements are responsible for displaying any form of visual data. The display elements can be similar to basic picture elements, or pixels, that are used for displaying data. Examples of display elements include, but are not limited to, picture elements in a LCD display panel. In one implementation, portions 108 and 110 can be implemented through lenticular lenses.

The capturing elements capture visual data associated with a source. The array of capturing elements is placed so that they are interspersed with the display elements. The capturing elements are not, in the exemplary embodiment, distributed over the entire surface area of display area 104 but are confined within a definite portion, for example, portions 108 and 110. Hence only part of display area 104, i.e., portions 108 and 110, would be capable of both displaying and capturing images. It would be noted that portions 108 and 110 when displaying visual information, would do so in a manner such that they display data seamlessly in conjunction with the remaining display area 104. The working mechanism of the integrated display sensing array is further described in U.S. patent application Ser. No. 10/873,575, filed by Apple Computer Inc., of Cupertino, Calif., U.S.

Portions 108 and 110 are positioned on display area 104 such that they are separated by an offset distance. The offset distance is approximately equivalent to the intraocular distance, i.e., the average distance between the human eyes. Portions 108 and 110 are so placed allowing capturing of images that correspond to the left and right perspective of a source. The left and the right perspective of the source are typically images that are perceived by the left and the right eye. Typically the left and the right perspectives of the source are perceived by the eyes as two different images. Biological impulses traversing from the eyes to the brain are assimilated by the brain and create the perception of a single image in place of two different images.

The left and right perspectives of the source, which are captured by portions 108 and 110, are synthesized by a synthesizing module 112. Synthesizing module 112 processes the images corresponding to the perspectives of the source, resulting in a synthesized image. The synthesized image is such that it enables a user to view the synthesized image as a 3D image. The synthesized image can be viewed, perhaps at a later time (using display 104 or another display) as a 3D image with the assistance of external agents, for example, anaglyph glasses. The working of synthesizing module 112 is further described in detail in conjunction with FIG. 2. The synthesized image may, depending upon the display, consist of two interleaved frames (interleaved either spatially or temporally) in order to provide the three dimensional effect desired when ultimately displayed to a user.

Figure 2:
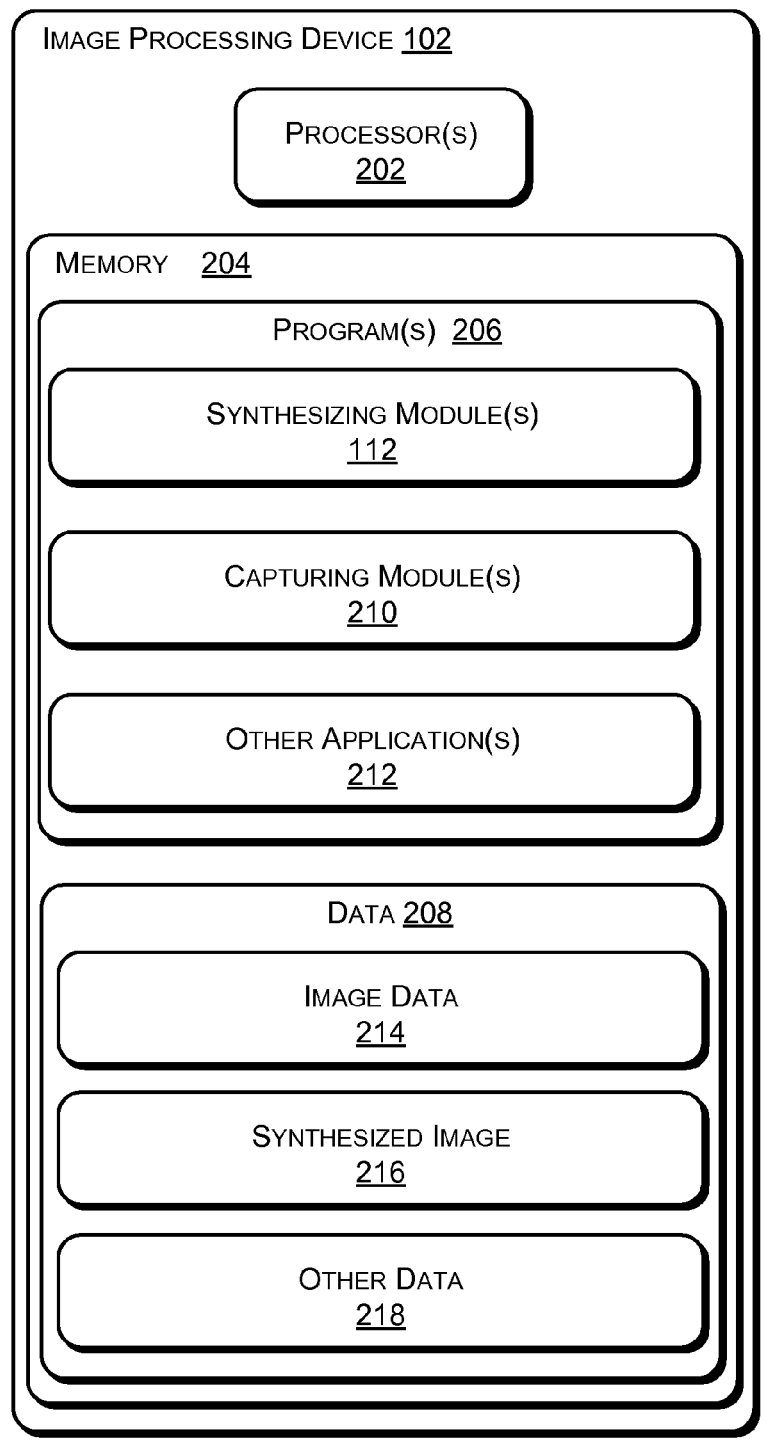
FIG. 2 illustrates a computing-based device for capturing and displaying images in a 3D format.

FIG. 2 illustrates one or more components of an exemplary image processing device 102. Image processing device 102 is capable of capturing images of source and processing captured data with the assistance of one or more program modules.

Image processing device 102 includes one or more processors 202 and a memory 204. Memory 204 can be any of the memories that are conventionally known in the art, for example, memory 204 can be a read-only memory (ROM) or a random access memory (RAM). Memory 204 further includes instructions that can be executed by processor 202 for performing one or more functions for operating image processing device 102.

Memory 204 further includes program(s) 206 and data 208. Program(s) 206 include one or more processing modules that are instrumented to perform general or specific functions for operating image processing device 102. Data 208 includes image data 214, synthesized image 216, and other data 218. Other data 218 can include data that is generated by the execution of one or more processing modules in program(s) 206.

Program(s) 206 further include synthesizing module 112, capturing module(s) 210, and other application(s) 212. Other application(s) 212 include applications that supplement the functionality provided by one or more modules in program(s) 206. Examples of such applications include, but are not limited to, the operating system for image processing device 102, word processing applications, and email applications.

As previously indicated, synthesizing module 112 is capable of synthesizing the images that are captured by capturing portions 108 and 110. The capturing of the images is implemented by capturing module(s) 210. Capturing module(s) 210 enable the capturing of images through portions 108 and 110. Portions 108 and 110 capture images that correspond to the left and right perspective of the source (for which the images are being captured). The captured images, corresponding to the left and right perspectives of the source, are stored in image data 214.

In one implementation, portions 108 and 110 are separated by an offset distance that is approximately equal to the intraocular distance, i.e., the average distance between the human eyes. Portions 108 and 110 are separated by the offset distance so as to best simulate the manner in which the human eyes perceive and respond to visual stimulus.

Image data 214, therefore, includes data and images that correspond to the captured left and right perspectives of the source. Image data 214 is then synthesized by synthesizing module 112 to result in a synthesized image. Data associated with synthesized image and the image itself is stored in synthesized image 216.

In one implementation, synthesizing module 112 generates synthesized image 216 by associating image data 214 with one or more attributes. For example, synthesizing module 112 associates the left and right perspectives of the source with complimentary colors. Examples of complimentary color include color pairs, for example, red and blue. For example, synthesizing module 112 associates the left perspective with color red and the right perspective with color blue. It would be noted that at this stage, each of the left and right perspectives are attributed by different and independent complimentary colors. Synthesizing module 112 then overlaps the attributed images such that the two attributed images are separated by an image offset distance. The image offset distance can be dependent on the offset distance that separates portions 108 and 110. The overlapping image, which is the resulting synthesized image 216, is eventually displayed. Synthesized image 216 when viewed with anaglyph glasses (with similar complimentary colored lenses), enables the user to perceive synthesized image 216 as a 3D image.

In another implementation, synthesizing module 112 generates synthesized image 216 by associating the left and right perspectives of a source with different planes of polarization. For example, synthesizing module 112 associates the left perspective with a first plane of polarization. Images or visual radiation associated with a specific plane of polarization would be perceptible through a polarizing filter if the plane of the polarizing filter is parallel to the plane of polarization. Similarly, the right perspective is associated with another plane of polarization, wherein the plane of polarization is perpendicular to the plane of polarization of the first polarization. It would be noted that each of the left and right perspectives are now attributed with a plane of polarization. Synthesizing module 112 overlaps the attributed images such that the two attributed images are separated by the image offset distance. The overlapping image, which is the resulting synthesized image 216, is eventually displayed. Synthesized image 216 when viewed with special glasses (with similar polarized filters as lenses), enables the user to perceive synthesized image 216 as a 3D image. Similarly, image data 214 can be associated with other attributes that allow a generation of synthesized image 216, wherein synthesized image 216 is capable of being perceived as a 3D image.

Exemplary Method(s)

Exemplary methods for capturing and displaying images in 3D format are described with reference to FIGS. 1 and 2. These methods may be described in the general context of instructions that can be executed on a computing device. Generally, such instructions include routines, programs, objects, components, data structures, procedures, modules, functions, and the like that perform particular functions or implement particular abstract data types.

Figure 3:
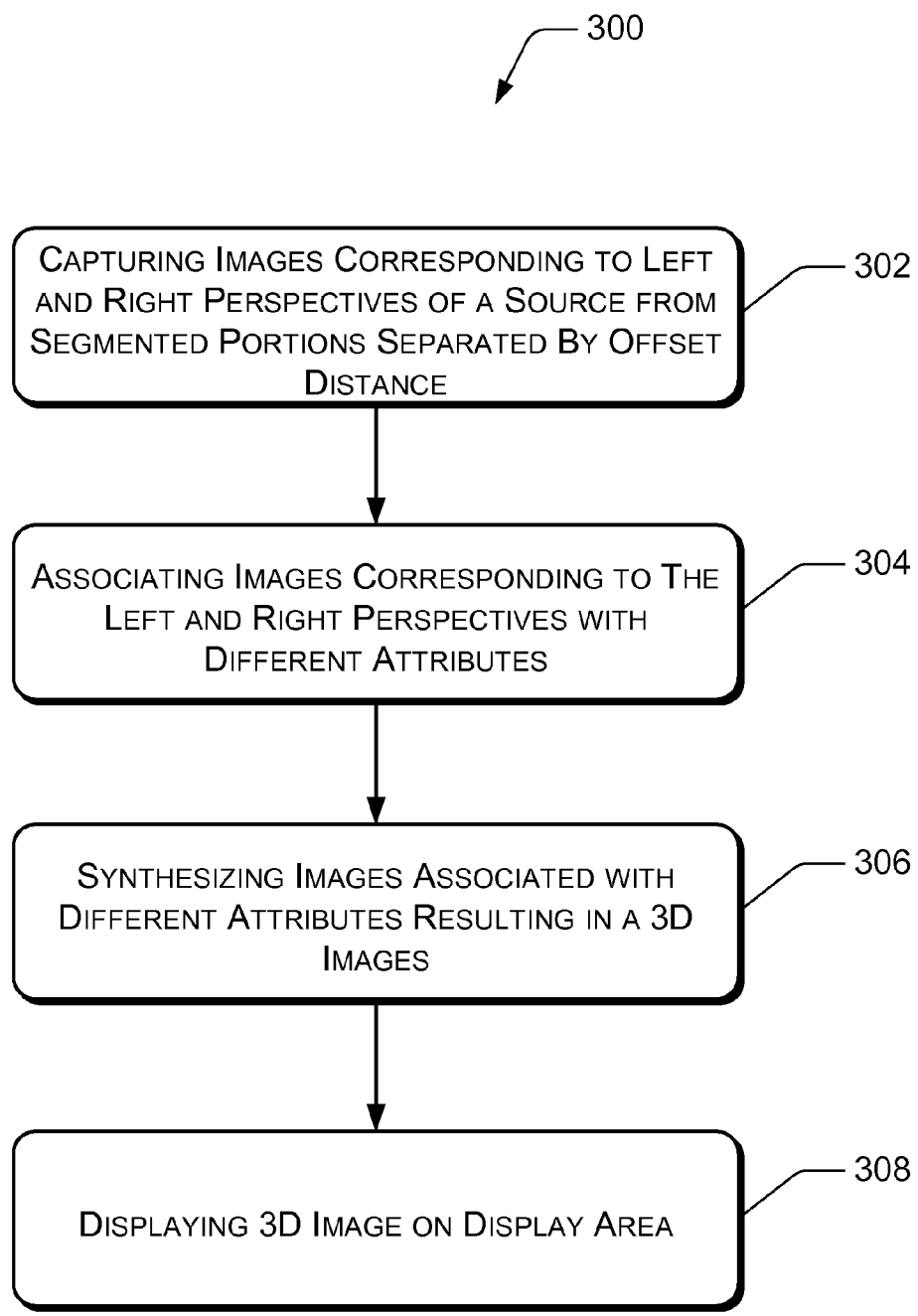
FIG. 3 illustrates exemplary method for capturing and displaying images in a 3D format.

FIG. 3 illustrates an exemplary method 300 for capturing and displaying images in a 3D format on an image processing device, say image processing device 102.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof, without departing from the scope of the invention.

At block 302, images corresponding to left and right perspectives of a source are captured. For example, capturing module(s) 210 captures the left and right perspectives of the source, which are stored as image data 214. The capturing of image data 214 is implemented through portions 108 and 110. Portions 108 and 110 are so displaced on display area 104, such that they are separated by an offset distance approximately equal to the intraocular distance.

At block 304, images corresponding to the left and right perspectives are associated with one or more attributes. For example, synthesizing module 112 associated one of the perspectives, say right perspective captured by capturing module (s) 210 with a color selected from a group comprising complimentary colors. The other perspective, i.e., the left perspective is associated with the other color. In one implementation, the left and right perspectives can be associated with planes of polarization, wherein the associated planes are perpendicular to each other.

At block 306, images associated with one or more attributes are synthesized to result in a synthesized image. For example, synthesizing module 112 synthesizes images associated with various attributes to result in synthesized image 216. Synthesized image 216 is generated by synthesizing module 112 by overlapping the attributed images such that the overlapping images are offset by an image offset distance. The image offset distance is such that it is partially proportional to the offset distance separating portions 108 and 110.

At block 308, the synthesized image is displayed on the display area of the image processing device. For example, synthesizing module 112 displays synthesized image 216 onto the display area 104. Synthesized image 216 being displayed may be visually incoherent but would be perceptible as 3D image when viewed through appropriate visual aids, like anaglyph glasses.

CONCLUSION

Although implementations for capturing and displaying images in 3D format have been described in language specific to structural features and/or methods, it is to be understood that the subject of the appended claims is not necessarily limited to the specific features or methods described. Rather, the specific features and methods are disclosed as exemplary implementations of the claimed subject matter.

The invention claimed is:

1. A system for synthesizing a digital three dimensional image of a source, comprising:
    a display area, comprising:
    an array of display elements, wherein each of the display elements is configured to display a pixel of information;
    a first portion of capture elements distributed among the display elements and configured to digitally capture a left eye perspective of the source;
    a second portion of capture elements distributed among the display elements and configured to digitally capture a right eye perspective of the source, wherein the first and second portions are separated by an offset distance that allows capture of a three dimensional perspective of the source;
    a synthesizing module for:
    synthesizing the digital three dimensional image from the images captured by the first and second portions, based at least in part on the offset distance, wherein the left eye perspective of the synthesized three dimensional image is based on the left eye perspective captured by the first portion of the capture elements, and the right eye perspective of the synthesized three dimensional image is based on the right eye perspective captured by the second portion of the capture elements.

2. The system of claim 1, wherein the offset distance is at least the average intraocular distance of a human being.

3. The system of claim 1, wherein the synthesizing module associates the images corresponding to the left and right perspectives of the source with a different color.

4. The system of claim 1, wherein the synthesizing module associates complementary colors with the images corresponding to the left and right perspectives of the source respectively.

5. The system of claim 1, wherein the synthesizing module renders the synthesized image onto a display area as a perceivable three dimensional image.

6. The system of claim 1, wherein the synthesizing module further associates a first plane of polarization with the image corresponding to either the left or the right perspective of the source.

7. The system of claim 6, wherein the synthesizing module associates a second plane of polarization with the other image corresponding to either the left or the right perspectives of a source, wherein the first and second plane of polarization are substantially perpendicular to each other.

8. The system of claim 7, wherein the synthesizing module renders the synthesized image as a three dimensional image when viewed through anaglyph glasses.

9. The system of claim 1, wherein the display elements are integrated with lenticular lenses.

10. A method for synthesizing a digital three dimensional image of a source, comprising:
 capturing images corresponding to left and right perspectives of the source by a first portion of capture elements integrated with display elements, and configured to digitally capture a left eye perspective of the source;
 a second portion of capture elements integrated with the display elements and configured to digitally capture a right eye perspective of the source,
 wherein the first and second portions are separated by an offset distance that allows capture of a three dimensional perspective of the source, wherein each of the display elements is configured to display a pixel of information, either alone or in combination with other display elements;
 synthesizing the digital three dimensional image from the left and right eye perspectives captured by the first and second portions, based at least in part on the offset distance,
 wherein the left eye perspective of the synthesized three dimensional image is based on the left eye perspective captured by the first portion of the capture elements, and the right eye perspective of the synthesized three dimensional image is based on the right eye perspective captured by the second portion of the capture elements.

11. The method of claim 10, wherein the first and second portions are separated by at least the average intraocular distance of a human being.

12. The method of claim 10, wherein the synthesizing comprises associating the images corresponding to the left and right perspectives of the source with either a red color or a cyan color such that both the images are associated with a different color.

13. The method of claim 10, wherein the synthesizing further comprises associating the images corresponding to the left and right perspectives of the source with a first and second plane of polarization respectively, wherein the first and second plane of polarization are substantially perpendicular to each other.

14. The method of claim 10 further comprises displaying the synthesized image, wherein displaying comprises rendering the synthesized image onto the display area, wherein the synthesized image is perceived as a three-dimensional image when viewed through anaglyph glasses.

15. The method of claim 10 further comprises displaying the synthesized image, wherein displaying comprises displaying the synthesized image through the display elements, wherein the display elements are integrated with a plurality of lenticular lenses.

16. A mobile device for synthesizing a digital three dimensional image of a source and comprising:
 a display area, comprising:
  an array of display elements, wherein each of the display elements is configured to display a pixel of information,
  a first portion of capture elements, interstitially placed between the display elements, and configured to digitally capture a left eye perspective of the source, and
  a second portion of capture elements, interstitially placed between the display elements, and configured to digitally capture a right eye perspective of the source, wherein the first and second portions are separated by an average intraocular distance; and
 at least one processing module for:
  synthesizing the three dimensional image from the images left and right eye perspectives captured by the first and second portions, depending at least in part on the offset distance,
  wherein the left eye perspective of the synthesized three dimensional image is based on the left eye perspective captured by the first portion of the capture elements, and the right eye perspective of the synthesized three dimensional image is based on the right eye perspective captured by the second portion of the capture elements, and
  displaying the synthesized image.

17. The mobile device of claim 16, wherein the at least one processing module associates the images corresponding to the two perspectives of the source with red or cyan color respectively.

18. The mobile device of claim 16, wherein the at least one processing module attributes the images corresponding to each of the two perspectives of the source with different planes of polarization that are substantially perpendicular to each other.

19. The mobile device of claim 16, wherein the capture elements capture the images corresponding to the left and right perspectives of a source.

20. The mobile device of claim 16, wherein the at least one processing module renders the synthesized image onto the display area, wherein the synthesized image is perceived as a three-dimensional image when viewed through anaglyph glasses.

21. The system of claim 1, wherein the display elements are arranged in a plane, and the first and second portions of capture elements are co-planer to the display elements.

22. The system of claim 1, wherein the array of display elements is configured to display an image, and the image displayed by the display elements is not the source of the three dimensional image.

23. The method of claim 10, wherein the display elements are arranged in a plane, and the first and second portions of capture elements are co-planer to and distributed among the display elements.

24. The method of claim 10, wherein the array of display elements is configured to display an image, and the image displayed by the display elements is not the source of the three dimensional image.

25. The device of claim 16, wherein the display elements are arranged in a plane, and the first and second portions of capture elements are co-planer to the display elements.

26. The device of claim 16, wherein the array of display elements is configured to display an image, and the image displayed by the display elements is not the source of the three dimensional image.

* * * * *